United States Patent [19]

Schlapp et al.

[11] Patent Number: 4,572,612
[45] Date of Patent: Feb. 25, 1986

[54] PHOTOGRAPHIC OBJECTIVE WITH A FASTENING DEVICE

[75] Inventors: Werner Schlapp, Asslar; Willi Wiessner, Wetzlar, both of Fed. Rep. of Germany

[73] Assignee: Ernst Leitz Wetzlar GmbH, Wetzlar, Fed. Rep. of Germany

[21] Appl. No.: 537,700

[22] Filed: Sep. 30, 1983

[30] Foreign Application Priority Data

Oct. 2, 1982 [DE]  Fed. Rep. of Germany ... 8227716[U]

[51] Int. Cl.⁴ .......................... G02B 7/02; G03B 17/00
[52] U.S. Cl. ...................................... 350/257; 354/293
[58] Field of Search .................. 350/245, 251-252, 350/257; 354/81, 293; 248/187

[56] References Cited

U.S. PATENT DOCUMENTS 1,357,996  11/1920  Koehler .............................. 350/251
4,249,799   2/1981  Iglesias ............................. 350/251

FOREIGN PATENT DOCUMENTS 1053795   3/1959  Fed. Rep. of Germany ...... 354/293
1183358  12/1964  Fed. Rep. of Germany ...... 354/293
1227670  10/1966  Fed. Rep. of Germany ...... 354/293

Primary Examiner—William H. Punter
Attorney, Agent, or Firm—Schwartz, Jeffery, Schwaab, Mack, Blumenthal & Evans

[57] ABSTRACT

Disclosed is a photographic objective with a long focal length and a fastening device for a stand comprises a tubular structural element carrying optical elements, surrounded by an essentially annular holder. This holder is stationary in the axial direction and rotatable around the structural part. In addition to the fastening element capable of being joined to the stand, there is mounted in the outer wall of the holder means for locking the holder in predetermined positions.

6 Claims, 2 Drawing Figures

PHOTOGRAPHIC OBJECTIVE WITH A FASTENING DEVICE

BACKGROUND OF THE INVENTION

The present invention relates to a photographic objective having a long focal length with a fastening device for a stand or tripod.

It is known to provide on the external wall of the tube of a photographic objective having a long focal length a permanent platform with a threaded receiver for a stand or tripod. The pivoting of a camera attached to such an objective for the selection of a desired image format is possible only with the use of additional adjustable means, such as, for example, a ball-and-socket joint.

In order to avoid such an unstable configuration, it is known to mount the platform having the threaded receiver for the tripod by means of an annular element which surrounds the tube of the objective, and is rotatable on the objective. The fixing of the pivoting position desired is effected by means of at least one clamping screw or clamping piece. The disadvantage of such an arrangement resides in the deformation of the objective tube by the pressure of the clamping screw(s) or the clamping pieces and the resulting stressing of the optical element mounted in the tube.

For this reason, there are already known certain fastening devices for a stand or tripod which are fixed in predetermined locations by means of notches or detends. The locked in positions are released by means of a push button arranged on one side of the tube. The disadvantages of this arrangement is the poor, cumbersome operability of the push button.

SUMMARY OF THE INVENTION

It is therefore an object of the present invention to provide a photographic objective with a long focal length having a fastening device for a stand or tripod whereby the release of the fastening device locked in a predetermined position may be effected in a simple and convenient manner.

In accordance with the present invention there has been provided a photographic objective having a long focal length and being adapted for attachment to a supporting device, comprising a tubular structural part of the objective which carries at least one optical element; an essentially annular holder which surrounds the tubular part, is stationary in the axial direction and is capable of rotating around the tubular part; a fastening element mounted on the holder for attachment to the support device; and means, mounted in the external wall of the holder, for locking the holder in predetermined positions with respect to the circumference of the tubular part. In a preferred embodiment of the invention, the holder includes a portion on one side thereof which is enlarged in the direction perpendicular to the optical axis of the objective, this enlarged portion forming a widened support element, and the fastening element and the locking means are mounted on the support element.

Further objects, features and advantages of the present invention will become apparent from the detailed description of the invention which follows, when considered in light of the accompanying drawings.

DETAILED DESCRIPTION OF PREFERRED EMBODIMENTS

Figure 1:
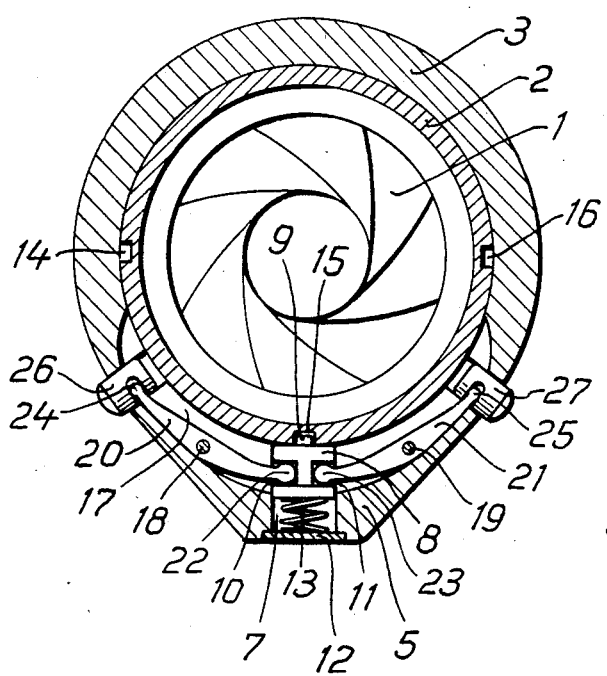
FIG. 1 is a rear elevation of an objective tube, partially in section.

According to the invention, a tubular structural part of the objective, which carries the optical components, is surrounded by an essentially annular holder, immobilized in the axial direction and rotatable around the structural part. In addition to the fastening element which is joinable to the stand, means for the locking of the holder in predetermined positions are mounted in the external wall of said holder.

In the drawing the invention is represented schematically by an examplary embodiment, which shall be described in more detail hereinbelow.

Figure 2:
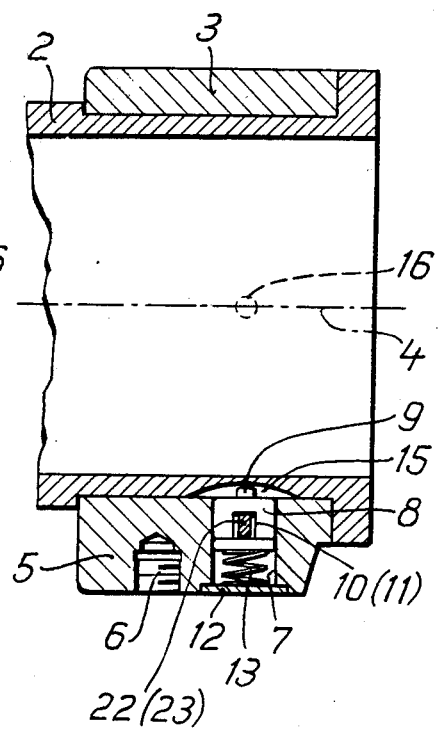
FIG. 2 is a lateral cross-sectional view of the tube.

In FIG. 1, optical elements are indicated by an iris diaphragm 1. They are carried by a tubular structural element 2 of a photographic objective, which is surrounded by an essentially annular holder 3. The holder 3 is mounted on said element 2 so as to be stationary in the direction of the axis 4, but capable of rotating around the element 2. Considered in section perpendicular to the optical axis 4, the holder 3 is expanded on one side and is widened into a support piece 5, in which a threaded piece 6 (FIG. 2) is mounted in a recessed fashion for the fastening of a photographic objective on a stand or tripod.

Adjacent to the threaded piece 6, a bore hole 7 is provided in the support piece 5, into which a locking bolt or pin 8 is inserted. The locking bolt or pin 8 is equipped with a rectangular nose 9 and with registering slots 10, 11 located perpendicularly to its longitudinal axis and extending parallel to each other. With its nose 9, the locking bolt 8 drops under the pressure of a spring 13, inserted in the bore 7 and resting against a cover plate 12 in the support piece 5, into the corresponding recesses 14, 15, 16 on the tubular structural part 2, thereby locking the holder 3 in the position selected.

A groove 17 is provided on the inside of the carrier piece 5, in which the levers 20, 21 pivot around the axles 18, 19, which extend parallel to the optical axis 4.

With their inner ends 22, 23, the levers 20, 21 engage the registering slots 10, 11 of the locking bolt or pin 8. Their outer ends 24, 25 are connected with the pressure pieces 26, 27, which are supported in the holder 3. Upon the actuation of one of the pressure pieces 26 or 27 the corresponding lever 20 or 21 lifts the nose 9 of the locking bolt or pin 8, against the force of the spring 13, from one of the recesses 14, 15 or 16.

What is claimed is:

1. A photographic objective having a long focal length and being adapted for attachment to a supporting device, comprising:
    a tubular structural part of the objective which carries at least one optical element and which has a plurality of recesses arranged radially on the external wall thereof;
    an essentially annular holder which surrounds said tubular part, is stationary in the axial direction and is capable of rotating around said tubular part;
    a fastening element mounted on said holder for attachment to the support device; and
    means, mounted in the external wall of said holder, for locking the holder in said recesses, said recesses arranged in predetermined positions with respect to the circumference of said tubular part;

wherein said holder includes a portion at one side thereof which is enlarged in the direction perpendicular to the optical axis of the objective, said enlarged portion forming a widened support element having a face for application to said supporting device, and wherein the fastening element and the locking means are mounted on said support element.

2. A photographic objective according to claim 1, wherein said locking means comprises at least one latching element inserted in a radially directed bore of the holder and a spring contained in said bore and biasing the latching element toward said tubular part for engaging said plurality of recesses.

3. A photographic objective according to claim 2, wherein said latching element comprises a latching pin.

4. A photographic objective according to claim 3, wherein the inwardly directed end of said latching pin has a conical shaped nose portion for engaging with one of said recesses.

5. A photographic objective according to claim 3, wherein said latching pin includes at least one recess on its side and said holder includes a circumferentially extending recess therein, and wherein said locking means further comprises at least a lever pivotably mounted in said holder recess, with one end of said lever engaging in said recess in said latching pin, and at least one actuating element located on the exterior of said holder and engaging the other end of said lever, for actuating said lever to lift said locking pin out of its locking position.

6. A photographic objective according to claim 5, wherein said latching pin comprises two recesses in opposite sides thereof and said latching means comprises two of said levers and two of said actuating elements positioned on opposite sides of said latching pin.

* * * * *